2,880,218

PROCESS FOR THE PREPARATION OF STEROID COMPOUNDS

John Selwyn Hunt, Montrose, Angus, Scotland, and Alan Gibson Long, Greenford, Middlesex, and Bernard Mooney, Hanwell, London, England, assignors to Glaxo Laboratories Limited, Greenford, England, a British company No Drawing. Application May 14, 1956
Serial No. 584,423

Claims priority, application Great Britain May 16, 1955

13 Claims. (Cl. 260—397.45)

This invention is concerned with a novel process for the production of steroid compounds, whose D ring and the side-chain attached thereto may be represented by the general formula

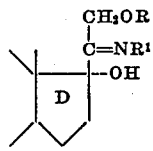
(I)

where R is an acyl group, and $R^1$ is $NHCONHR^2$ or $OR^2$ ($R^2$ being hydrogen, an alkyl group containing from 1 to 4 carbon atoms, a benzyl group, a phenyl or a substituted phenyl group).

In order to convert cortisone into cortisol ($11\beta:17\alpha:21$-trihydroxy-pregn-4-ene-3:20-dione) it is necessary first to protect the ketone groups at positions 3 and 20, then to reduce the 11-ketone to an $11\beta$-hydroxyl group, and finally, to remove the protective groups from positions 3 and 20, under conditions which will not cause dehydration of the $11\beta$-hydroxyl group. Such processes have been described by Wendler et al. (J. Amer. Chem. Soc., 1951, 73, 3819) and Antonucci et al. (J. Org. Chem., 1953, 18, 70). Both these authors used cortisone and analogous 17:21-dihydroxy-20-keto compounds containing a free hydroxyl group at the 21-position as their starting materials and they found that where the 21-hydroxyl group was esterified, protection of the 20-keto group by forming a derivative thereof was not possible due to steric hindrance arising from the presence of the 21-ester group. Thus Wendler et al. (loc. cit.) stated that cortisone acetate and 4-bromo-17α:21-dihydroxy-5β-pregnan-3:11:20-trione-21-acetate were found to yield exclusively 3-mono-semicarbazones (when treated with semicarbazide in an attempt to protect the 3- and 20-keto-groups) even under forcing conditions in the presence of an excess of reagent. Similarly Antonucci et al. (loc. cit.) and also other workers have found it impossible to form the 3:20-bisethylene ketals of Reichstein's Compound S acetate and cortisone acetate. Since synthetic methods for the production of most 17α:21-dihydroxy-20-keto-steroids, such as cortisone, yield in the first place the 21-esters of these compounds, it is necessary first to hydrolyse such ester groups before the series of reactions described above, involving as it does reaction with a less hindered 20-ketone group, can be carried out. This process is difficult to control, and may involve rearrangement to a D-homo steroid (cf. Batres et al., J.A.C.S., 1954, 76, 5171) and also involves an extra step and hence loss in yield.

In spite of the generally held opinion and the observations of Wendler et al., and Antonucci et al., we have now found a method by which it is possible to prepare derivatives of the 20-keto group in 17α-hydroxy-20-keto-21-acyloxy steroids without first having to hydrolyse the ester grouping, which method also reduces other disadvantages of the prior processes referred to above. The present invention therefore provides a general method for the formation of certain derivatives of the 20-keto group in 17α-hydroxy-20-keto-21-acyloxy steroids and more particularly provides an improved method of converting cortisone - 21 - esters, 4:5α - dihydrocortisone-21-esters and similar compounds containing 3:11:20-triketo groups, such as $\Delta^1$-cortisone-21-esters, to the corresponding $11\beta$-hydroxy-3:20-diketo compounds. The method according to the invention is in particular more efficient than the conventional acid catalysed methods.

The present invention particularly provides advantages in that the process is more easily controlled and there is less tendency for side-reactions to take place than in the prior acid catalysed processes; also an initial hydrolysis step is avoided.

According to the present invention, therefore, we provide a process for the preparation of steroid compounds, whose D ring and the side-chain attached thereto may be represented by the general formula

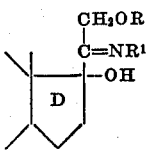
I where R is an acyl group such as an acetyl, propionyl, benzoyl or phenylacetyl group and $R^1$ is $NHCONHR^2$ or $OR^2$ ($R^2$ being hydrogen, an alkyl group containing from 1 to 4 carbon atoms, a benzyl group, a phenyl or a substituted phenyl group) in which a 17α-hydroxy-20-keto-21-acyloxy steroid is reacted with a salt of a compound $H_2NR^1$ in the presence of a tertiary amine having a pK value not greater than 7.6.

The use of relatively weak bases (i.e. those having a pK value of less than 7.6) is of course necessary in that stronger bases would tend to bind the acid portion of the salt of the compound $H_2NR^1$ thus inhibiting the reaction.

It is in general preferable that the reaction be carried in a substantially homogeneous liquid phase; the tertiary amine used should therefore preferably be one in which the reaction components are soluble or may be caused to dissolve by the addition of water. For these reasons it is often desirable to use a water-miscible tertiary amine since then in most cases the addition of small quantities of water will ensure that the reaction medium is homogeneous.

We prefer to use pyridine or aqueous pyridine as the solvent for the reaction and we find that the rate of reaction is increased by the addition of an aqueous mineral acid, such as hydrochloric acid or sulphuric acid, to the reaction mixture; it will of course be clear that the amount of acid added must not be in excess of the quantity of tertiary amine present. The reaction is preferably carried out at room temperature. Other tertiary amines which can be used include N:N-dimethylaniline and the picolines.

The course of the reaction may be followed by observing the optical rotation of the reaction mixture which decreases with the formation of a derivative of the 20-ketone group; it should however be remembered that the formation of derivaties of other keto groups, e.g. in the 3-position may in itself cause an increase in rotation. Care should then be taken in interpreting the changes in rotation observed.

Completion of the reaction is also indicated by the absence of reaction between the reaction product and triphenyltetrazolium chloride, which gives a characteristic colour with a dihydroxy-acetone grouping; the carrying out of such a test is described in Example 1 hereof.

As mentioned above, where the steroid starting material possesses other reactive ketone groupings, these may also be transformed into the corresponding derivative of the compound $H_2NR^1$. Thus, for example, a keto group in the 3-position in a steroid saturated or bearing one double bond in ring A will form such derivatives while keto groups in the 11-position in general will not. It is of course generally known that 3-keto groups are in general reactive whilst 11-keto groups are not. The keto group in the 3-position of a $\Delta^{1,4}$-steroid is also relatively unreactive.

The invention particularly includes a process for the production of the bis-oximes of cortisone-21-acetate and 4:5α-dihydrocortisone-21-acetate which comprises reacting at least two molecules of a hydroxylamine salt e.g. the hydrochloride with cortisone-21-acetate or 4:5α-dihydrocortisone-21-acetate in solution in pyridine. The invention further includes a process for the production of the bis-semicarbazones of cortisone-21-acetate and 4:5α-dihydrocortisone-21-acetate which comprises reacting at least two molecules of a semicarbazide salt, e. g. the hydrochloride, with cortisone-21-acetate or 4:5α-dihydrocortisone-21-acetate in solution in aqueous pyridine.

It will be appreciated that should it be desired to avoid formation of derivatives of the compound $H_2NR^1$ with reactive keto groups other than at the 20-position, such other reactive keto groups may be protected. Thus, for example, if it be desired to form the 20-mono-oxime or 20-mono-semicarbazone of a cortisone-21-ester, the 3-keto group may be first protected by formation of a 3-ethyleneketal.

Certain of the compounds which may be prepared by the process according to the invention are new, and the invention further comprises, as new compounds, the 21-esters of cortisone-3:20-bis-oxime and 4:5α-dihydrocortisone-3:20-bisoxime.

Specific preferred new compounds are the 21-acetate of cortisone-3:20-bis-oxime which has the following characteristics:

M.P. 207–209° C.

$[\alpha]_D$ +162° (c., 0.7 in dioxan)

the 21-acetate of 4:5α-dihydrocortisone 3:20-bis-oxime which has the following characteristics:

M.P. 203–204° C.

$[\alpha]_D$ +136° (dioxan)

and the 21-acetate of 4:5α-dihydrocortisone bis semicarbazone which has the following characteristics:

M.P. 200–220° C. (decomp.)

$[\alpha]_D$ +21° (pyridine)

It should be understood that the above characteristics were shown by the purest material we have been able to obtain and may be liable to variation dependent on the purity of any particular sample of the compound in question.

These compounds are inter alia valuable intermediates for producing the 11-hydroxy analogues of the parent 11-keto compounds.

In order that the invention may be well understood the following examples are given by way of illustration only:

In the examples the temperatures at which many of the bisoximes and bissemicarbazones described below decompose are not in all cases reproducible, since they depend on the size of the crystals and rate of heating.

In the oximes and methoxime described the presence of a 21-acetate group was shown by bands in their infra-red spectra at about 1735 and 1240 cm.$^{-1}$; strong hydrogen bonding shifted these to about 1700 and 1280 cm.$^{-1}$, this effect being particularly marked when Nujol mulls of the compounds were examined (cf. Dickson, Page, and Rogers, J.C.S., 1955, 443). As the absorption due to the acetate group in the semicarbazones was involved with other strong bands, its presence was confirmed by saponifying the compound, acidifying the lye with a non-volatile mineral acid and titrating the volatile acid.

Ultra-violet absorption characteristics pertain to ethanolic solutions of the compounds.

EXAMPLE 1

*21-acetoxy-17α-hydroxy-3:20-bisoximinopregn-4-en-11-one (cortisone acetate-3:20-bisoxime)*

Cortisone acetate (1 g.) in anhydrous pyridine (20 ml.) was mixed with a solution of hydroxylamine hydrochloride (1 g.) in anhydrous pyridine (10 ml.). The rotation became steady at $\alpha$=6.63° (1 dm. tube) after the solution had been left to stand for 60 hr. at room temperature. An aliquot taken at this time yielded by precipitation a solid that gave no colour with alkaline triphenyltetrazolium salts (known hereinafter as TPTZ). Aliquots taken earlier gave a red colour, owing to incomplete oximation of the ketol system. Direct testing of the original solution is unreliable, because an excess of hydroxylamine or semicarbazide colors with TPTZ (cf. Snow. J.C.S., 1954, 2588; Rogers, J.C.S., 1955, 769); the original solution was diluted with a nearly equal volume of ice-cold water, whereupon crystals separated. After further dilution of this mixture, the crystals of the foregoing dioxime (0.88 g.) were washed copiously with water and dried. They occurred after desiccation at 90° C./0.5 mm. as needles, M.P. 206–209° C. (decomp.) $[\alpha]_D^{20}$ +165° (c., 1; dioxan), giving no colour with TPTZ. Recrystallisation from a solvent composed of ethanol, methylene dichloride and n-hexane gave a pure specimen as birefringent needles, turning brown at 201° C. and melting with decomp. at 207–209° C. $[\alpha]_D^{20}$ +162° (c., 0.7; dioxan), $\lambda$ max. 240 m$\mu$, $\epsilon$ 22,600. (Found: C, 63.9; H, 7.1; N, 6.7. $C_{23}H_{32}O_6N_2$ requires C, 63.9; H, 7.4: N, 6.5%.) Paper chromatography of this material showed that it was homogeneous.

In pyridine containing initially 10% (v./v.) water the oximation was completed in 90 hrs. at room temperature; otherwise the experiment gave similar results to the above.

EXAMPLE 2

By a method similar to that described above for cortisone acetate, the following oximes were obtained in yields better than 85% of theoretical by reacting the corresponding 20-keto-21-acetates with hydroxylamine hydrochloride in pyridine solution, 21 - acetoxy - 17α - hydroxypregn - 4 - ene - 3:20 - bis-oxime [(*Reichstein's Compound S acetate*)-*3:20-bis-oxime*].—Yield 88%, M.P. 174–176° C., $[\alpha]_D$ +136° (dioxan), $\lambda$ max. 240 m$\mu$, $\epsilon$ 21,400. Found: C, 65.4; H, 7.5; N, 6.5. $C_{23}H_{34}O_5N_2$ requires C, 66.0; H, 8.2; N, 6.7%.

*4:5α-dihydrocortisone acetate-3:20-bisoxime.* — Yield 89%, M.P. 203–204° C., $[\alpha]_D$ +41° (dioxan). Found: C, 63.9; H, 7.75; N, 5.80. $C_{23}H_{34}O_6N_2$ requires C, 63.6; H, 7.9; N, 6.45%.

*Reichstein's Compound D diacetate 20-oxime.*—Yield 100%, M.P. 231–232° C., $[\alpha]_D$ +13° (dioxan). Found: C, 64.8; H, 8.0; N, 3.1. $C_{25}H_{37}O_7N$ requires C, 64.8; H, 8.05; N, 3.0%.

In addition, 21-acetoxy-17α-hydroxy-pregn-4-ene-3:11:20-trione (cortisone acetate) was reacted with O-methylhydroxylamine hydrochloride in pyridine in conditions similar to those described above for the formation of the oxime, affording cortisone acetate 3:20-bis(methoxime). Yield 85%, M.P. 159.5–162.5° C., $[\alpha]_D$ +203° (chloroform), $\lambda$ max. 249 m$\mu$, $\epsilon$ 20,200. Found: C, 65.5; H, 8.05; N, 6.5. $C_{25}H_{36}O_6N_2$ requires C, 65.2; H, 7.9; N, 6.1%.

EXAMPLE 3

*21 - acetoxy - 17α - hydroxy - 3:20 - bis - semicarbazono-pregn-4-en-11-one (cortisone acetate bis-semicarbazone)*

Cortisone acetate (1 g.) in pyridine (25 ml.) was mixed with a solution of semicarbazide hydrochloride (5.4 g.) in water (6 ml.) and diluted with pyridine (25 ml.) and conc. hydrochloric acid (6.2 ml.). (The final concentration was about N with respect to HCl.) The rotation (in a 1 dm.-tube) decreased from $\alpha$ +5.60° (after 1.75 min.) to $\alpha$ +5.12° (64 hrs.), and then remained constant. Aqueous sodium acetate was added to remove the free hydrochloric acid, most of the solvents were distilled off in vacuo and the residue was diluted with water. The above-named bis-semicarbazone (1.23 g.; 93%), darkening and sintering at 200° C., but M.P. above 310° C., $[\alpha]_D^{22}$ +225° (c., 0.9; pyridine) was then filtered off. It gave no colour with TPTZ. Crystallisation from methanol gave the pure bis-semicarbazone as needles, M.P. above 300 C., $[\alpha]_D^{20}$ +206° (c., 0.49; pyridine)
and $$\lambda \max. 242.5 \, m\mu (E_{1\,cm.}^{1\%} 434)$$

and $$269 \, m\mu (E_{1\,cm.}^{1\%} 561)$$

and giving no colour with TPTZ. (Found: C, 56.6; H, 7.3; N, 16.1; acetyl, 8.1. $C_{25}H_{36}O_6N_6.\frac{1}{2}H_2O$ requires C, 57.15; H, 7.1; N, 16.0; acetyl, 8.2%.)

EXAMPLE 4

In a similar way Reichstein's Compound S acetate and 4:5α-dihydrocortisone acetate gave the corresponding semi-carbazones (see below) in yields of about 90%.

21 - acetoxy - 17α - hydroxy - 3:20 - bis - semicarbazonopregn-4-ene, needles from methanol, M.P. 300° C., $[\alpha]_D^{20}$ +108° (c., 0.45; pyridine)

$$\lambda \max. 269 \, m\mu \, (E_{1\,cm.}^{1\%} 679)$$

and giving no colour with TPTZ. (Found: C, 58.2; H, 7.7; N, 16.35; acetyl, 8.1. $C_{25}H_{38}O_5N_6.\frac{1}{2}H_2O$ requires C, 58.75; H, 7.7; N, 16.4; acetyl, 8.4%.)

21 - acetoxy - 17α - hydroxy - 3:20 - bis - semicarbazone-5α-pregnan-11-one, needles from methanol, M.P. 200–220° C. (dec.), $[\alpha]_D^{22}$ +21° (c., 0.53; pyridine), $$\lambda \max 231 \, m\mu, \, E_{1\,cm.}^{1\%} \, 468$$

and giving no colour with TPTZ. (Found: C, 54.5; H, 7.75; N, 15.5; acetyl 8.1%. $C_{25}H_{38}O_6N_6.1.5H_2O$ requires C, 55.0; H, 7.6; N, 15.4; acetyl 7.9%.)

EXAMPLE 5

21 - acetoxy - 3:3 - ethylenedioxy - 17α - hydroxy - 20-oximinopregn-5-en-11-one (cortisone acetate-3-ethylene ketal - 20 - oxime).—21 - acetoxy - 3:3 - ethylenedioxy-17α-hydroxypregn-5-en-11:20-dione was dissolved in pyridine (20 mls.) and mixed with a solution of hydroxylamine hydrochloride (1 g.) in pyridine (20 mls.). After 6 days the rotation of the solution became constant and the steroid was precipitated by the addition of water. The crude product (0.71 g.; M.P. 182–189° C.) was crystallised from aqueous ethanol to give 21-acetoxy-3:3-ethylenedioxy - 17α - hydroxy - 20 - oximinopregn - 5-en-11-one, M.P. 218–223° C., $[\alpha]_D$ +9° (chloroform). Found: C, 65.25; H, 7.8; N, 3.3. $C_{25}H_{35}O_7N$ requires C, 65.05; H, 7.6; N, 3.0%.

EXAMPLE 6

3β:21 - diacetoxy - 17α - hydroxy - 20 - semicarbazono-5-pregnan-11-one.—Reichstein's Compound D diacetate (500 mg.) was shaken with pyridine (32.5 ml.), concentrated hydrochloric acid (2.25 ml.), water (2.5 ml.) and ethyl acetate (10 ml.) for 7 days. After 3 days, more ethyl acetate (10 ml.) was added. There resulted two phases, the lower being yellow. Most of the solvent was distilled off in vacuo and water added to the residue to precipitate the semicarbazone as microplates (527 mg., 93%), M.P. 244–246° C., $[\alpha]_D^{23}$ ±0° (c., 1.0, pyridine), $\lambda$ max. 239.5 m$\mu$ ($\epsilon$ 9960).

EXAMPLE 7

4:5α - dihydrocortisone acetate 3:20 - bis - semicarbazone.—4:5α-dihydrocortisone acetate (100 g.) was dissolved in a solution containing concentrated hydrochloric acid (500 mls.), pyridine (4450 mls.) and semicarbazide hydrochloride (540 g.). After standing for 5 days sodium acetate (1500 g.) was added to neutralise the hydrochloric acid. The volume of the reactants was reduced to small bulk by distillation under reduced pressure, water (10 l.) was then added to the residue to precipitate the bis-semicarbazone which was removed by filtration and dried at 100° C./16 mm. This product (126 g.; 98%) had $[\alpha]_D$ +20° (pyridine), $\lambda$ max. 230 m$\mu$, $$E_{1\,cm.}^{1\%} \, 504$$

Found: N, 16.4. $C_{25}H_{38}N_6$ requires N, 16.2%.

EXAMPLE 8

4:5α-dihydrocortisone acetate (1 g.) was dissolved slowly in hot N:N-dimethylaniline (25 ml.) and the solution was added to the mixture obtained by treating a solution of semicarbazide hydrochloride (5.4 g.) in water (6 ml.) with the base (25 ml.) and conc. hydrochloric acid (6.2 ml.). The cooled, brown mixture was shaken at room temperature for 90 hr., during which time it thickened; it was then diluted with water and sodium acetate trihydrate (15 g.) was added. The suspension was evaporated at <60° C. to remove most of the organic base and the residue was diluted with water (500 ml.). A fine, brown precipitate settled during 2 hr. standing at 0° C., but filtration afforded a gummy product smelling strongly of dimethylaniline. This was washed with ethanol to leave a friable product, light yellow in colour (1.17 g.), shrinking at 216° C., but not disintegrating at <350° C. $[\alpha]_D^{23}$ +26° (c., 1.28; pyridine), $$\lambda \max. 230–231 \, m\mu \, (E_{1\,cm.}^{1\%} \, 494)$$

giving no TPTZ colour. (Found: N, 15.05. Calc. for $C_{25}H_{38}O_6N_6.1.5H_2O$: N, 15.4.)

EXAMPLE 9

4:5α-dihydrocortisone acetate (1.0 g.) in β-picoline (25 ml.) was treated with semicarbazide hydrochloride (5.4 g.) in β-picoline (25 ml.) containing water (6 ml.) and conc. hydrochloric acid (6.2 ml.). The colourless solution was allowed to stand at room temperature for 88 hrs. The optical rotation of the solution fell from 1.69° to 0.58°. Sodium acetate solution (50 ml.: 10%) was added and the solvents evaporated under reduced pressure to small bulk. The precipitate of the 3:20-bis-semicarbazone produced by the addition of water (100 ml.) was filtered off, washed and dried (1.12 g.). Decomposition point 235–260° C., $[\alpha]_D^{20}$ +19° (pyridine, 0.47%), $$\lambda \max. 229–230 \, m\mu \, (E_{1\,cm.}^{1\%} \, 487).$$

(Found: N, 14.06.)

We claim:
1. A process for the preparation of steroid compounds the D ring of which and the side-chain attached thereto are represented by the general formula

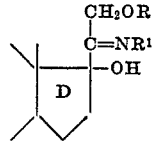

where R is an acyl group derived from a carboxylic acid selected from the group consisting of a lower alkanoic acid, benzoic acid and phenylacetic acid and $R^1$ is a member selected from the group consisting of

—NHCONHR² and —OR² radicals in which $R^2$ is a member selected from the group consisting of a hydrogen atom, an alkyl group containing from one to four carbon atoms, a phenyl group and a benzyl group, which process comprises reacting in the presence of a tertiary amine having a pK value of not greater than 7.6, a salt of a compound $H_2NR^1$ in which $R^1$ has the above meaning, with a steroid compound selected from the group consisting of a steroid having the general formula

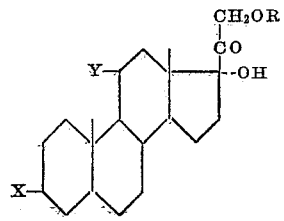

and the $\Delta^4$ and $\Delta^{1:4}$ analogues thereof in which R has the above meaning, X is a member selected from the group consisting of an oxygen atom, a hydroxyl group, an ethylene ketal group and an acyloxy group, the acyl radical of which is derived from a lower alkanoic acid, and Y is a member selected from the group consisting of oxygen and hydrogen atoms.

2. The process of claim 1 in which the steroid compound has an α-hydrogen atom in the 5-position.

3. A process as claimed in claim 1 in which the reaction is carried out in a homogeneous liquid phase.

4. A process as claimed in claim 1 in which the starting material is a cortisone-21-ester of a carboxylic acid selected from the group consisting of a lower alkanoic acid, benzoic acid and phenylacetic acid.

5. A process as claimed in claim 1 in which the starting material is a 4:5α-dihydrocortisone-21-ester of a carboxylic acid selected from the group consisting of a lower alkanoic acid, benzoic acid and phenylacetic acid.

6. A process as claimed in claim 1 in which the tertiary amine is water miscible.

7. A process as claimed in claim 6 in which the tertiary amine is pyridine.

8. A process as claimed in claim 6 in which water is present in the amine to solubilise the reaction components.

9. A process as claimed in claim 6 in which the tertiary amine contains an aqueous mineral acid.

10. A process for producing the bis-oxime of cortisone-21-acetate which comprises reacting cortisone-21-acetate with at least two molecular proportions of a hydroxylamine salt in solution in an aqueous water-miscible tertiary amine having a pK value of not greater than 7.6.

11. A process for producing the bis-semicarbazone of cortisone-21-acetate which comprises reacting cortisone-21-acetate with at least two molecular proportions of a semi-carbazide salt in solution in an aqueous water-miscible tertiary amine having a pK value of not greater than 7.6.

12. A process for the production of the bis-oxime of 4:5α-dihydrocortisone-21-acetate which comprises reacting 4:5α-dihydrocortisone-21-acetate with at least two molecular proportions of a hydroxylamine salt in solution in an aqueous water-miscible tertiary amine having a pK value of not greater than 7.6.

13. A process for the production of the bis-semi-carbazone of 4:5α-dihydrocortisone-21-acetate which comprises reacting 4:5α-dihydrocortisone-21-acetate with at least two molecular proportions of a semi-carbazide salt in solution in an aqueous water-miscible tertiary amine having a pK value of not greater than 7.6.

References Cited in the file of this patent
UNITED STATES PATENTS

| | | |
|---|---|---|
| 2,628,966 | Graber | Feb. 17, 1953 |
| 2,769,020 | Hershberg | Oct. 30, 1956 |